United States Patent
Foley

(10) Patent No.: US 7,774,250 B1
(45) Date of Patent: Aug. 10, 2010

(54) SYSTEMS AND METHODS FOR PROVIDING VALID RESPONSES TO REQUESTS FOR QUOTATIONS

(75) Inventor: Kevin M. Foley, New York, NY (US)

(73) Assignee: BGC Partners, Inc., New York, NY (US)

( * ) Notice: Subject to any disclaimer, the term of this patent is extended or adjusted under 35 U.S.C. 154(b) by 932 days.

(21) Appl. No.: 11/436,219

(22) Filed: May 18, 2006

Related U.S. Application Data

(60) Provisional application No. 60/739,120, filed on Nov. 23, 2005.

(51) Int. Cl.
G06Q 400/10 (2006.01)

(52) U.S. Cl. .......................................... 705/35
(58) Field of Classification Search ............... 705/35
See application file for complete search history.

(56) References Cited

U.S. PATENT DOCUMENTS

| | | | |
|---|---|---|---|
| 6,014,627 A | 1/2000 | Togher et al. | |
| 6,857,309 B2 * | 2/2005 | Mansky | 506/12 |
| 7,043,457 B1 | 5/2006 | Hansen | |
| 7,069,234 B1 | 6/2006 | Cornelius et al. | |
| 7,085,740 B1 * | 8/2006 | Meyers | 705/37 |
| 7,162,448 B2 * | 1/2007 | Madoff et al. | 705/37 |
| 7,197,483 B2 * | 3/2007 | Brady et al. | 705/37 |
| 7,299,208 B1 * | 11/2007 | Bailon et al. | 705/37 |
| 2002/0138400 A1 | 9/2002 | Kitchen et al. | |
| 2004/0024689 A1 * | 2/2004 | Zhou et al. | 705/37 |
| 2004/0210512 A1 * | 10/2004 | Fraser et al. | 705/37 |
| 2006/0020536 A1 | 1/2006 | Renton et al. | |

OTHER PUBLICATIONS

Anath Madhavan. The Upstairs Market for Large-Block Transactions: Analysis and Measurement of Price Effects. The Review of Financial Studies, vol. 9, No. 1 (Spring, 1996), pp. 1-36.*

Notification of Transmittal of the International Search Report for the International Application No. PCT/US06/4506 dated Sep. 24, 2007, 3 pages.

Written Opinion of the International Searching Authority for International Application No. PCT/US06/4506, dated Sep. 24, 2007 4 pages.

Australian Examiner's Report for Application No. 2006318584, dated Nov. 19, 2009 (1 page).

* cited by examiner

Primary Examiner—James P Trammell
Assistant Examiner—Abdul Basit
(74) Attorney, Agent, or Firm—Oleg Mestechkin

(57) ABSTRACT

Systems and methods for providing valid responses to requests for quotations are provided. In one embodiment of the invention, a system according to the invention preferably includes a server. The server includes a server storage device and a server processor connected to the server storage device. The server storage device preferably stores a server program for controlling the server processor. The server processor is preferably operative to receive a request from a requesting participant for a market-validated offer to sell an item; receive an offer price from a responding participant in response to the request; and provide a bid to an electronic marketplace, the bid including a price that is lower than the received offer price.

24 Claims, 3 Drawing Sheets

SYSTEMS AND METHODS FOR PROVIDING VALID RESPONSES TO REQUESTS FOR QUOTATIONS

CROSS-REFERENCE TO RELATED APPLICATION

This application claims the benefit of U.S. Provisional Patent Application No. 60/739,120, filed Nov. 23, 2005.

BACKGROUND OF THE INVENTION

The present invention relates to electronic trading systems. More specifically, the present invention relates to electronic trading systems that are based on a Request for Quote (RFQ) trading method.

An RFQ method typically is initiated by a first participant transmitting a request to multiple participants for a quote (either a request for a bid or a request for an offer) in a particular market. For example, a first participant may request that a select group of participants provide the first participant a bid for 50 million dollars in notional value (hereinafter referred to by "m", i.e., 50 million=50 m) of 5-year United States Treasure Notes. Each of the group of responding participants may respond with a quote for which the respective participant would purchase the 50 m of 5-Year Notes. Then, the first participant may select to trade with the best quote from the returned quotes.

The advent of RFQ-based electronic trading substantially increased trading volume in certain sectors of the fixed-income securities market. In addition, RFQ-based electronic trading, in part due to the increased volume of the market which generated greater transparency, also substantially reduced transaction costs—e.g., margins—for the participants that were requesting quotes.

The reduced margins have been substantially caused by reduced dealer fees in RFQ-based electronic trading. Moreover, RFQ-based electronic trading also has minimized the importance of the bond dealer/bond client relationship because the most important determining factor in the selection of one of the responding participants in RFQ-based electronic trading in the retail Treasury market has become price (in the U.S. Treasury Market, the clients typically request quotes and the dealers typically respond to the requests). This minimization of the importance of the bond dealer/bond client relationship has increased price competition among dealers, and thereby has negatively impacted the dealers' profitability. The substantial negative impact on the dealers' profitability has led to a general degradation of the retail bond industry and may, in fact, eliminate all but a few of the participants from the industry. This decreases competition and subsequently harms the public interest in having a highly competitive retail bond market.

It is therefore desirable for the preservation of the retail bond industry to provide systems and methods that restore the bond dealer/bond client relationship in RFQ-based electronic trading while preserving the pricing advantages that have been achieved in the recent past.

SUMMARY OF THE INVENTION

It is an object of the invention to provide systems and methods that restore the bond dealer/bond client relationship in RFQ-based electronic trading while preserving the pricing advantages that have been achieved in the recent past.

This and other objects are accomplished in accordance with the principles of the invention by providing systems and methods for displaying market information for, and allowing for electronic trading in, items through a user interface. More specifically, some embodiments of the invention provide a dialog box for use with an electronic trading system that processes market-validated bids and/or offers. One or more requests for such a bid (or offer) on an item may be received by the system from a requesting participant. In response to the request, a bid (or offer) may be received from a responding participant and an offer (or bid) comprising a higher (or lower) price may be made by the responding participant, or other suitable party, to an electronic marketplace. Such an electronic marketplace may be the Two-Year U.S. Treasury Note electronic marketplace of eSpeed, Inc. of New York, N.Y. or other suitable electronic marketplace. (In certain embodiments of the invention, "hot keys" may be employed which specify specific marketplaces, such as an "eSpeed" button, for validation.) If the offer (or bid) is accepted in the marketplace, the item is sold at the offer price (or bought at the bid price) on behalf of the requesting participant. Moreover, the responding participant may be provided with a commission for making the successful offer to the market place. If, on the other hand, the offer (or bid) is not accepted in the marketplace, a transaction for the item may be executed between the requesting participant and the responding participant at the bid (or offer) price received from the responding participant. Accordingly, the requesting participant can deal with one preferred party instead of many, while still insuring that he or she is receiving a competitive bid.

Systems and methods for providing valid responses to requests for quotations are provided. In one embodiment of the invention, a system according to the invention preferably includes a server. The server includes a server storage device and a server processor connected to the server storage device. The server storage device preferably stores a server program for controlling the server processor. The server processor is preferably operative to receive a request from a requesting participant for a market-validated offer to sell an item; receive an offer price from a responding participant in response to the request; and provide a bid to an electronic marketplace, the bid including a price that is lower than the received offer price. If the bid is accepted in the marketplace, the server processor is operative to buy the item at the lower price of the bid on behalf of the requesting participant. If the bid is not accepted in the marketplace, the server processor is operative to execute a transaction for the item between the requesting participant and the responding participant at the offer price received from the responding participant.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
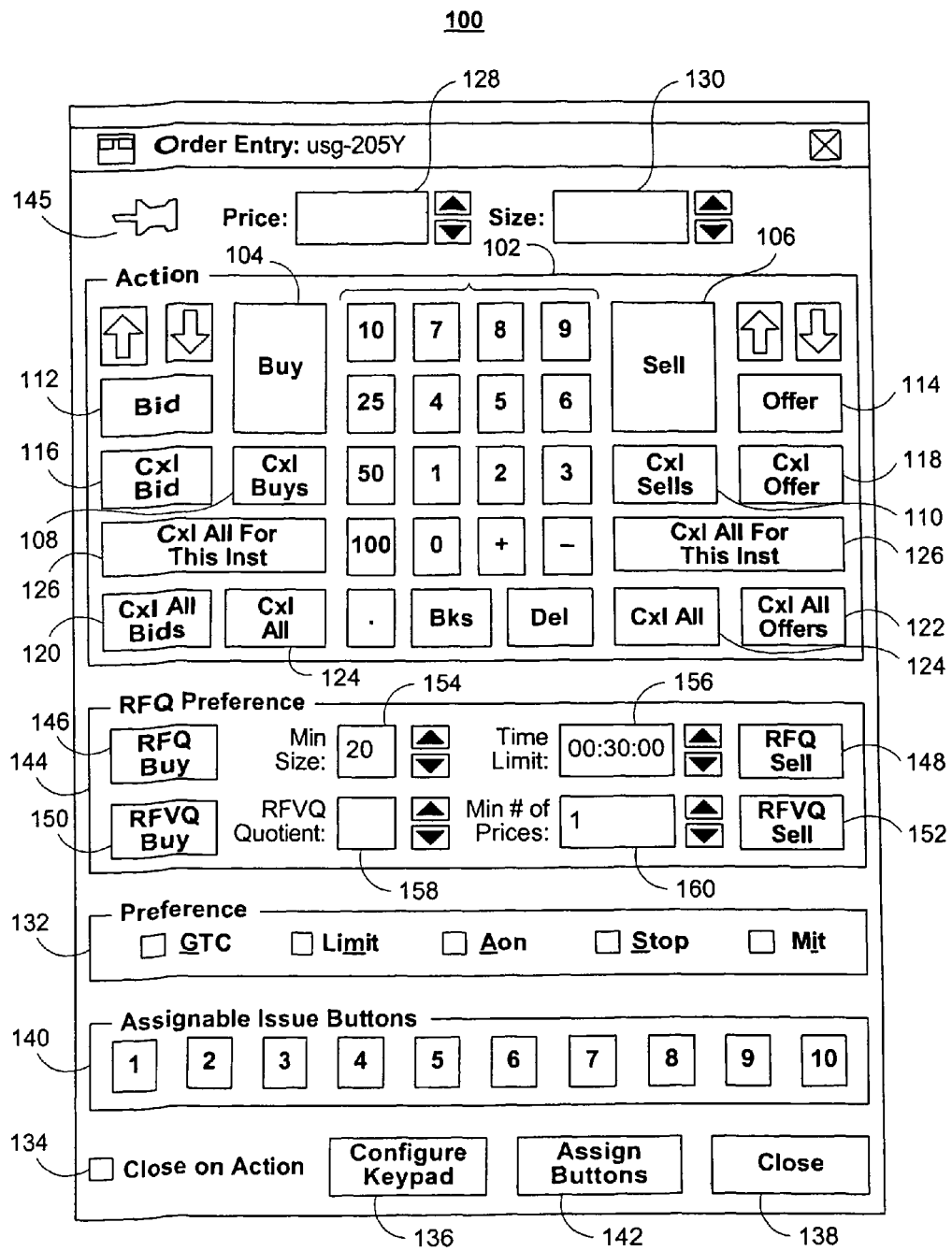
FIG. 1 is an illustration of a dialog box that may be displayed to users in accordance with certain embodiments of the present invention.

Systems and method according to the present invention preferably provide a validated response to an RFQ that allows participants to take advantage of the price competition among quote providers while reintroducing elements of the bond dealer/bond client relationship back into the bond retail business.

In some embodiments of the present invention, an order type is provided that allows the participant to preferentially weigh the returned quotes of one or more responding participants. For example, when a participant requests a validated bid according to the invention, for 50 m of 5-year Notes (the request may be made from one or more participants), the responding participants may respond with a bid at a price of 100.16+ (this terminology denotes that the responding participants have shown an intent to buy 50 m 5-year Notes at a price of $1,005,156 per million dollar denomination of the note). This bid, according to the invention, may preferably be in the form of a stop order—i.e., the responding participant guarantees that he will buy the 50 m for at least 100.16+, and, depending on market conditions as will be explained, may buy the 50 m at a higher price. After the requesting participant responds by hitting the bid—i.e., accepting to sell the 50 m to the bidder—the responding participant (or the electronic trading system on behalf of the requesting participant) then posts an offer, which may be for the same volume or different volume as the accepted bid, preferably in a suitably liquid, preferably electronic marketplace. The posted offer may include a price that is some pre-determined user-defined, or system pre-configured, increment higher than the accepted bid. Alternatively, the responding participant (or the electronic trading system) may post the offer before, or substantially simultaneously to, his presenting the bid to the requesting party.

If the posted offer (which, to reiterate, is preferably higher than the accepted bid) is lifted—i.e., accepted—by a third party in the marketplace, then the responding party, essentially acting as an agent for the requesting party, sells the 50 m of Treasury Notes of the requesting party at the higher price (than the responding participant was willing to pay) of the posted offer on behalf of the requesting party. The responding party may receive a commission on such a transaction because the responding party had committed to bid for the item and, as a result of his bid, a higher price was obtained from the market. However, because, at the end of the trade, the responding party's bid was replaced by a higher bid obtained from the marketplace, the responding party is preferably not a principle in the trade.

Alternatively, the responding party may in fact become a principle in the trade, and, thereby actually sell the 50 m in the marketplace preferably only to buy the 50 m back from the requesting party.

If the posted offer is not lifted, then the responding party buys the 50 m of Treasury Notes from the requesting party at the price of the accepted bid. In this case, the responding party is a principle in the trade. The system may require that the posted offer be available to be traded in an appropriate electronic trading system for a predetermined period of time. This period of time may be preconfigured or user-definable.

One of the advantages of systems and methods according to the present invention is that, in some embodiments, the requesting party can deal with one preferred dealer instead of many, while still insuring that he or she is receiving a competitive bid. As such, the dealer/client relationship can be reestablished because the price associated with the response is market tested. In one embodiment of this aspect of the invention, the system may restrict the requesting party to a predetermined number of dealers in a month. Thus, by selecting a dealer, the requesting party has shown a certain discernible preference for the dealer that has been selected.

In another aspect of the invention, the data derived from these trades may be controlled and disseminated either as encrypted (or encoded) data, which can then be unencrypted (or unencoded) by an authorized end user. This market data may be sold to interested parties or otherwise distributed in a selective fashion.

The relative validity of the response may be modified to be either more valid with respect to market conditions or less valid with respect to market conditions by adjusting certain parameters. For example (with respect to the embodiment set forth above) by increasing the size of the increment between the responding bid and the posted offer, the chance of a third party lifting the posted offer is decreased. Therefore, a larger increment decreases the relative validity of the responding bid because the posted offer (which is being used to test the market) is far enough from the proposed bid such that the bid is not validated by exposure to the market. Rather, in most cases, the posted offer will not be accepted and the bid will result in a trade.

Conversely, when the increment between the responding bid and the posted offer is relatively small, the validity of the responding bid is increased. When the posted offer is relatively close to the responding bid, third party market participants are more likely to accept the posted offer because the price is lower and therefore third party market participants are more likely to bid. In other words, the price of the responding bid is relatively more valid because, in this instance, it can be said that the proposed bid is closer to the true market price.

As described above, another parameter that can be adjusted is the amount of time the posted offer is required to be maintained in an available state—i.e., other participants are allowed to take the posted offer—the electronic marketplace. The longer the posted offer is required to be exposed in the marketplace, the more valid the responding bid will be. This principle follows the simple reasoning that it is more likely that another participant will exist that is willing to bid more than the responding party at some point during the longer period of time. Thus, the requestor is more likely to receive an incrementally higher price for the 50 m of Treasury Notes.

Yet another modifiable parameter that may be adjusted is the commission paid by the requesting participant to the responding participant when a third party accepts the posted offer. Though this parameter may be adjusted, it does not directly affect the validity of the offer but, instead, directly addresses the relationship between the dealer and the client.

By modifying parameters such as the responding bid/posted offer increment, the exposure time and the commission for a third party market transaction (or other suitable modifiable parameters), the dealer and the client can effectively enter into a relationship similar to the relationship provided before the onset of electronic trading. Moreover, by taking advantage of the benefits of the available electronic marketplaces, the client is protected from being restricted to a single dealer because the dealer is forced to expose a price that is better than the dealer's bid price to the competition of the marketplace in order to validate the dealer's bid.

In alternative embodiments of the present invention, any of the parameters that affect the validity of a bid or offer may preferably be combined by some appropriately weighted algorithm to form a single validity quotient. By presenting a single modifiable number to a client and dealer, the dealer may provide preferential treatment to one dealer over another dealer by adjusting the validity quotient lower for the preferred dealer. Although such a lower validity quotient may reduce the validity of the bid provided by the preferred dealer, the preferred dealer may provide the client with other benefits that compensate for the preferential treatment. In any event, systems and methods according to the present invention preferably provide a platform for the client and dealer to reestablish their relationship without denying any of the advantages provided by the competition in electronic trading. In fact, systems and methods according to the present invention use the electronic marketplace to reap the benefits of competitive pricing and high volume trading without subjecting the participants to the competitive pressures of a highly liquid trading environment where pricing pressures are enormous.

FIG. 1 illustrates an order entry dialogue box (hereinafter "OEDB") 100 for submitting an RFQ according to some embodiments of the present invention. OEDB 100 may provide the requesting participant with various options and entry fields. Using one or more of these options and entry fields, a participant may submit non-RFQ trade commands (i.e., standard trading commands), such as, a bid command, an offer command, a buy command, or a sell command for any suitable instrument. When OEDB 100 is activated, the fields in OEDB 100 are preferably populated with information pertaining to the instrument selected. For example, the current market price for the instrument may populate the price field.

Numeric keypad 102 may be located at the center of OEDB 100. Numeric keypad 102 may provide buttons for numbers zero through nine, and may contain buttons for numbers ten, twenty-five, fifty, and one hundred or any other suitable or desirable values. The numeric keypad may also contain a plus button ("+"), a minus button ("-"), a decimal point button ("."), a backspace button ("BKS"), and a delete button ("DEL").

OEDB 100 may provide a participant with buy option 104, sell option 106, cancel buys option 108, cancel sells option 110, bid option 112, offer option 114, cancel bids option 116, cancel offers option 118, cancel all bids option 120, cancel all offers option 122, cancel all option 124, cancel all for all instruments option 126, price entry field 128, and size entry field 130.

OEDB 100 may provide an RFQ preference field 144. RFQ preferences field 144 may be made available when the requesting participant selects RFQ option 145 from OEDB 100. Likewise, RFQ preferences field 144 may be removed from OEDB 100 when RFQ option 145 is selected again. Field 144 may provide a participant with RFQ buy option 146, RFQ sell option 148, RFVQ Buy option 150, and RFVQ Sell 152. RFQ buy option 146 and RFQ sell option 148 provide the requesting participant with the ability to submit an RFQ from a buyer position and an RFQ from a seller position, respectively. Options 150 and 152 provides the requesting participant with an opportunity to submit an RFQ that requests a valid quote either from a buyer position or from a seller position, respectively.

Minimum size field 154, time limit field 156, RFVQ Quotient field 158, and minimum number of prices field 160 are fields that may be incorporated in RFQ preference field 144. The requesting participant may specify a minimum size for an instrument he or she is willing to buy or sell in field 154. By populating field 156, the requesting participant may specify a time limit as to how long his or her RFQ is open for receiving a quote from a market participant. If the requesting participant desires to specify an RFVQ Quotient, as described above in more detail the requesting participant can specify the value in field 158 and select option 150. Alternatively, another set of fields may be provided that more particularly enumerate the factors that contribute to the RFVQ quotient. These factors may include, for example, the increment between the responding quote and the contra quote that the responding participant must place in the suitable electronic marketplace, the amount of time the contra quote must be posted for, and any other suitable factors.

Field 160, when populated, provides the requesting participant with an opportunity to specify the minimum number of quotes to receive from a market participant in response to his or her request.

OEDB 100 may also provide a trade preference field 132. Preference field 132 may be used to indicate the participant's preferred trade type and may allow the requesting participant to select any type of trade that a particular exchange or trading system supports. Although FIG. 1 provides specific examples of trade types (e.g., good-till-canceled (GTC), limit, all-or-none (AON), stop, and market-if-touched (MIT)), the present invention may be implemented with any type of suitable trade.

OEDB 100 may also provide an auto-execution feature for an RFQ. The auto-execution feature, when selected, may be used to automatically respond to a market participant's quote. For example, if a quote satisfying the requesting participant's criteria for accepting the quote is received, an accept confirmation may be automatically transmitted from the requesting participant and the trade may be executed. Other various features for managing quotes received in response to an RFQ may be incorporated into OEDB 100.

Options and fields provided in OEDB 100 may be reconfigured to suit any requesting participant's needs and preferences. Configure keypad option 136 may provide the requesting participant with the ability to reconfigure OEDB 100. Close-on-action box 134, when selected, may cause OEDB 100 to be automatically closed after specified actions are performed. Close option 138 allows the requesting participant to close OEDB 100 on demand. In addition, assignable issue buttons field 140 may be provided to allow the requesting participant to have a specific set of instructions executed by the push of a single button. Issue buttons in field 140 may be configured accordingly via assign buttons option 142.

Figure 2:
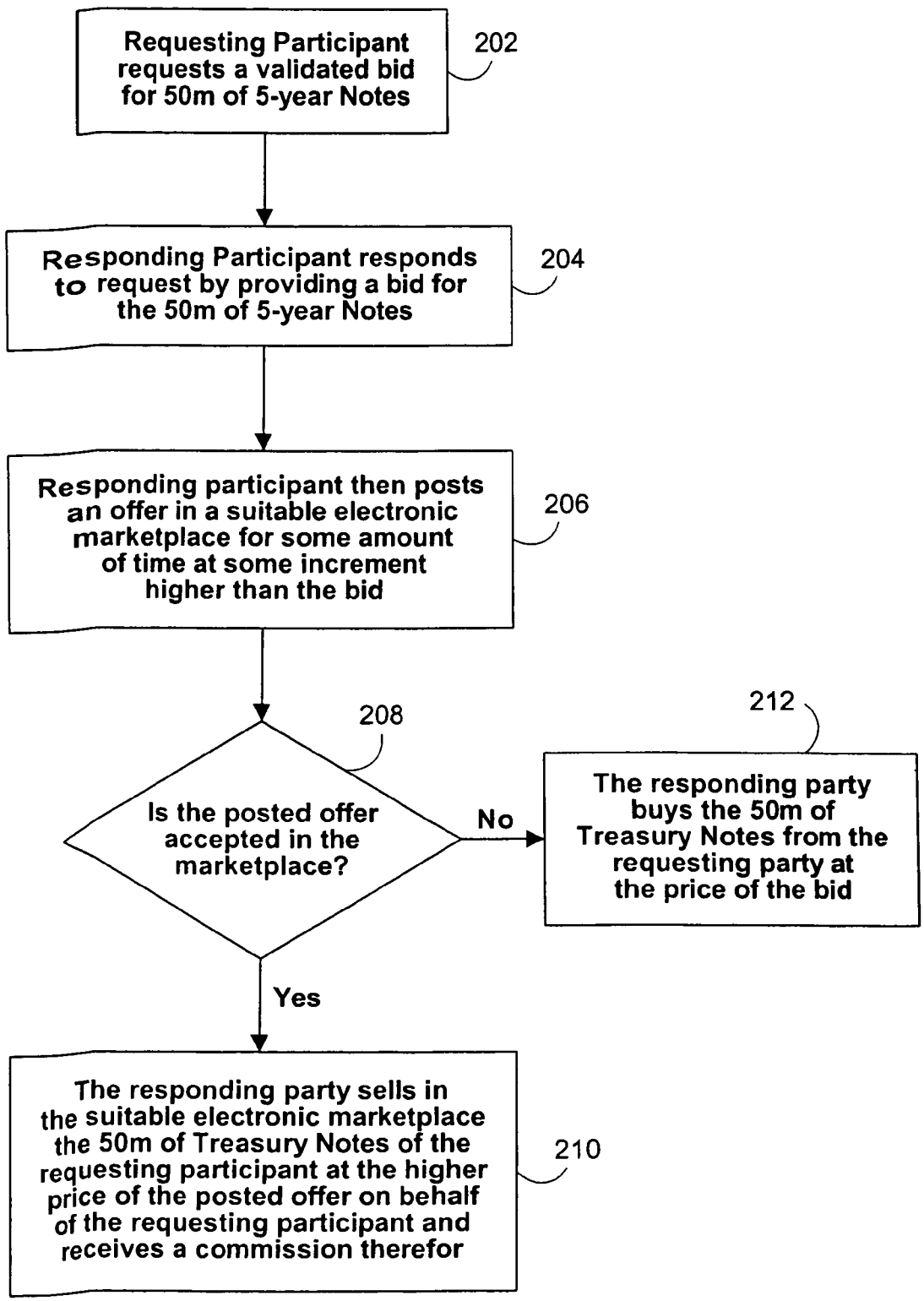
FIG. 2 is an illustration of a flow chart representing a process that may be used to perform the functions of certain embodiments of the present invention.

FIG. 2 is a flow chart that illustrates a method according to some embodiments of the present invention. Box 202 shows a participant requesting a validated bid according to the present invention for 50 m of 5-year Notes.

After the requesting participant responds by hitting the bid, as shown in box 204, a responding participant then posts an offer (preferably from some pre-determined time) in a suitable electronic marketplace, as shown in box 206. The offer may be for the same volume or different volume as the accepted bid. The posted offer may be some pre-determined increment higher than the accepted bid. It should be noted that the requesting participant may not be required to accept the responding participant's bid (or offer, as the case may be). Rather, the requesting participant may reject the bid and wait for the market response to the posted offer.

Box 208 queries whether the posted offer is accepted (commonly referred to as the offer is "lifted") in the marketplace. Box 210 shows that the responding participant sells the 50 m of Treasury Notes of the requesting participant at the higher price of the posted offer on behalf of the requesting participant and receives a commission therefore.

Box 212 shows that the responding participant buys the 50 m of Treasury Notes from the requesting participant at the price of the bid.

In one embodiment of the invention the visibility of the validation attempt with respect to a particular bid or offer may be particularly indicated to the requesting participant. For example, if participant x requests a validated bid for an item from participant y, then y must make an attempt to offer the item on a suitable marketplace. According to the invention, y can then offer on a preselected marketplace. The invention further discloses that y's offer may be indicated to x, assuming x, or a representative of x is viewing the marketplace, by showing y's offer in a different color, or with some other suitable visual indicator, on x's computer display or in some other suitable fashion. This "for your eyes only" feature allows selective display of the validated quote to a preselected participant.

Figure 3:
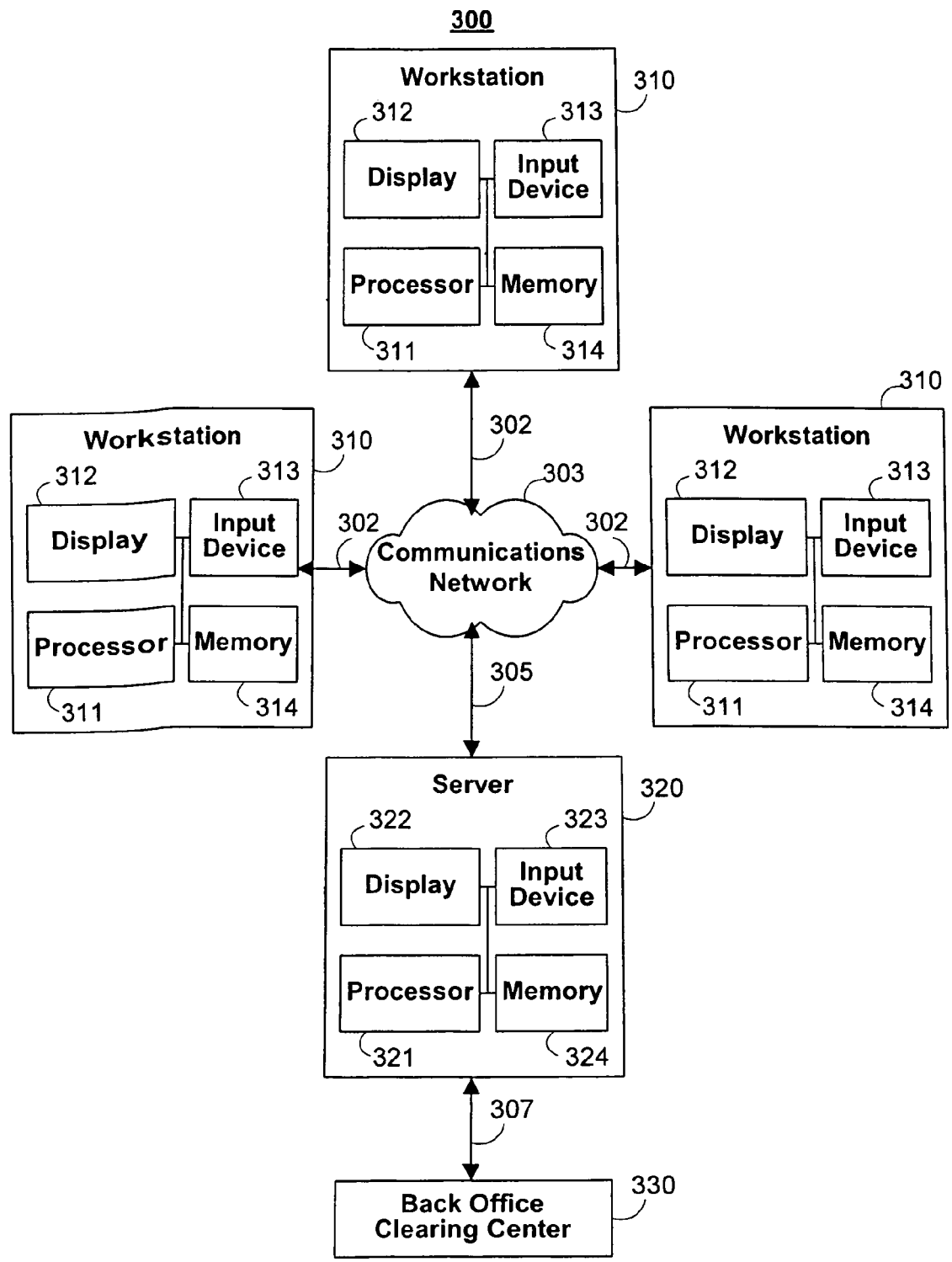
FIG. 3 is an illustration of an exemplary system that may be used to implement the processes and functions of certain embodiments of the present invention.

Referring to FIG. 3, exemplary system 300 for implementing the invention is shown. As illustrated, system 300 may include one or more workstations 310. Workstations 310 may be local or remote, and are connected by one or more communications links 302 to communications network 303 that is linked via communications link 305 to server 320. Server 320 may be linked to back office clearing center 330 via communications link 307.

Server 320 may be any suitable server, processor, computer, data processing device, or combination of the same. Server 320 may be used to implement the governing logic that processes and executes RFQ orders bids/offers and trades, and distributes trade and market information, including price and size information, to workstations 310. Communications network 303 preferably includes the Internet but may consist of any suitable computer network such as an intranet, a wide-area network (WAN), a local-area network (LAN), a wireless network, a digital subscriber line (DSL) network, a frame relay network, an asynchronous transfer mode (ATM) network, a virtual private network (VPN), or any combination of the same. Communications links 302 and 305 may be any communications links suitable for communicating data between workstations 310 and server 320, such as network links, dial-up links, wireless links, hard-wired links, etc.

Workstations 310 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 310 may be used by participants to enter, modify or cancel RFQ and other orders and other bid, ask, buy and sell orders for the items being traded and view market activity corresponding to these items.

A typical workstation 310 may include a processor that is higher (or lower) than the received bid (or offer price 311, display 312, input device 313, and memory 314, which may be interconnected. In a preferred embodiment, memory 314 includes a storage device for storing a workstation program for controlling processor 311. The workstation program may include a trading application for running the interface shown in FIG. 1 and displayed on display 312. The trading application may also run the process shown in FIG. 2. Input device 313 may be used in conjunction with display 312 by users to enter RFQ orders and other bids/offers on desired items, to provide bids/offers at different prices as described above and execute and monitor trades based thereon. Processor 311 may use the workstation program to receive trade information relating to the items being traded by multiple users of system 300, or other users, and display such information on display 312 or communicate such information to server 320.

Server 320 may include processor 321, display 322, input device 323, and memory 324, which may be interconnected.

In a preferred embodiment, memory 324 includes a storage device for storing a server program that provides the governing logic for controlling processor 321. Processor 321 may use the server program to process orders and execute trades communicated from various workstations that are operated by multiple users of system 300, or other users, and communicate trade information, as well as bid and ask information, to workstations 310 and back office clearing center 330. More specifically, processor 321 may use the server program to process RFQ and other orders placed by users, as well as posting other orders having higher offer prices or lower bid prices, and execute trades based on the response to such orders. Processor 321 may also perform at least some of the functions of processor 311.

Back office clearing center 330 may be any suitable equipment, such as a computer, a laptop computer, a mainframe computer, etc., or any combination of the same, for causing trades to be settled and/or verifying that trades are settled. Communications link 307 may be any communications links suitable for communicating data between server 320 and back office clearing center 330, such as network links, dial-up links, wireless links, hard-wired links, etc.

In view of the apparatus according to the invention described in FIG. 3, the following comments apply as well. It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus can include, e.g., a processor and those input devices and output devices that are appropriate to perform the method.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without being implemented on a central authority, such as if the system is practiced on a workstation associated with a dealer participant such as Goldman Sachs. (Nevertheless, in one embodiment, the prices for validation may be made available to trade on a central system such as the Two-Year U.S. Treasury Market for eSpeed, or alternatively, only within Goldman Sachs). In such an embodiment, any functions described herein as performed by the server computer or data described as stored on the server computer may instead be performed by or stored on one or more such devices. Alternatively, the present invention may be practiced by a substantially centralized authority which is configured as an external system, such as the eSpeed trading system described above.

It will be understood that the foregoing is only illustrative of the principles of the present invention, and that the invention can be practiced by other than the described embodiments, which are presented for purposes of illustration and not of limitation.

What is claimed is:

1. A method comprising:
  receiving, by a server, from a workstation in use by a requesting participant a request for quote for a bid on an item, wherein the server and the workstation are communicatively coupled via a communications network;
  receiving, by the server, from a workstation in use by a responding participant a bid on the item, wherein the bid is in response to the request for quote, wherein the bid comprises a first price, and wherein the server and the workstation in use by the responding participant are communicatively coupled via the communications network;
  receiving, by the server, from the workstation in use by the requesting participant a hit of the bid received from the responding participant, the requesting participant thereby accepting to sell the item to the responding participant;
  posting in an electronic marketplace by the server, in response to the requesting participant accepting to sell the item to the responding participant, an offer to sell the item at a second price that is higher than the first price, wherein the offer to sell is posted in the electronic marketplace on behalf of the requesting participant;
  determining, by the server, that the posted offer is accepted in the electronic marketplace by a third-party at the second price;
  executing, by the server, in response to determining that the posted offer is accepted in the electronic marketplace by the third-party at the second price, at least one transaction to trade the item between the requesting participant and the third-party at the second price; and providing, by the server, in response to determining that the posted offer is accepted in the electronic marketplace by the third-party at the second price, a commission to the responding participant.

2. The method of claim 1, further comprising:
  receiving, by the server, from the requesting participant a price increment specified by the requesting participant; and determining, by the server, the second price at which the offer is posted in the electronic marketplace by increasing the first price by the price increment.

3. The method of claim 1, further comprising:
determining, by the server, a pre-configured price increment; and determining, by the server, the second price at which the offer is posted in the electronic marketplace by increasing the first price by the price increment.

4. A method comprising:
receiving, by a server, from a workstation in use by a requesting participant a request for quote for an offer on an item, wherein the server and the workstation are communicatively coupled via a communications network;
receiving, by the server, from a workstation in use by a responding participant an offer on the item, wherein the offer is in response to the request for quote wherein the offer comprises a first price. And wherein the server and the workstation in use by the responding participant are communicatively coupled via the communications network;
receiving, by the server, from the workstation in use by the requesting participant a lift of the offer received from the responding participant;
the requesting participant thereby accepting to buy the item from the responding participant;
posting in an electronic marketplace by the server, in response to the requesting participant accepting to buy the item from the responding participant, a bid to buy the item at a second price that is lower than the first price, wherein the bid to buy is posted in the electronic marketplace on behalf of the requesting participant;
determining, by the server, that the posted bid is accepted in the electronic marketplace by a third-party at the second price;
executing, by the server, in response to determining that the posted bid is accepted in the electronic marketplace by the third-party at the second price, at least one transaction to trade the item between the requesting participant and the third-party at the second price; and
providing, by the server, in response to determining that the posted bid is accepted in the electronic marketplace by the third-parN at the second price, a commission to the responding participant.

5. The method of claim 4, further comprising:
receiving, by the server, from the requesting participant a price increment specified by the requesting participant; and determining, by the server, the second price at which the bid is posted in the electronic marketplace by decreasing the first price by the price increment.

6. The method of claim 4, further comprising:
determining, by the server, a pre-configured price increment; and determining, by the server, the second price at which the bid is posted in the electronic marketplace by decreasing the first price by the price increment.

7. An apparatus comprising:
a memory device; and at least one processor electronically connected to the memory device, the memory device storing instructions that when executed by the at least one processor direct the at least one processor to:
receive from a workstation in use by a requesting participant a request for quote for a bid on an item, wherein the apparatus is operable to communicate with the workstation via a communications network;
receive from a workstation in use by a responding participant a bid on the item, wherein the bid is in response to the request for quote wherein the bid comprises a first price, and wherein the apparatus is further operable to communicate with the workstation in use by the responding participant via the communications network;
receive from the workstation in use by the requesting participant a hit of the bid received from the responding participant, the requesting participant thereby accepting to sell the item to the responding participant;
post in an electronic marketplace in response to the requesting participant accepting to sell the item to the responding participant, an offer to sell the item at a second price that is higher than the first price, wherein the offer to sell is posted in the electronic marketplace on behalf of the requesting participant;
determine that the posted offer is accepted in the electronic marketplace by a third-party at the second price;
execute, in response to determining that the posted offer is accepted in the electronic marketplace by the third-party at the second price, at least one transaction to trade the item between the requesting participant and the third-party at the second price; and
provide, in response to determining that the posted offer is accepted in the electronic marketplace by the third-party at the second price, a commission to the responding participant;
determine that the posted offer is not accepted in the electronic marketplace; and
in response to determining that the posted offer is not accepted in the electronic marketplace, at least one transaction to trade the item between the requesting participant and the responding participant at the first price.

8. The apparatus of claim 7, wherein the instructions, that when executed by the at least one processor, further direct the at least one processor to:
receive from the requesting participant a price increment specified by the requesting participant; and
determine the second price at which the offer is posted in the electronic marketplace by increasing the first price by the price increment.

9. The apparatus of claim 7, wherein the instructions, that when executed by the at least one processor, further direct the at least one processor to:
determine a pre-configured price increment; and
determine the second price at which the offer is posted in the electronic marketplace by increasing the first price by the price increment.

10. The apparatus of claim 7, wherein the posted offer is to be available to be traded in the electronic marketplace for a predetermined period of time; and wherein to determine that the posted offer is not accepted in the electronic marketplace comprises to determine that the posted offer has been available to be traded in the electronic marketplace for the predetermined period of time and not accepted by another party.

11. An apparatus comprising:
a memory device; and at least one processor electronically connected to the memory device, the memory device storing instructions that when executed by the at least one processor direct the at least one server processor to:
receive from a workstation in use by a requesting participant a request for quote for an offer on an item, wherein the apparatus is operable to communicate with the workstation via a communications network;
receive from a workstation in use by a responding participant an offer on the item, wherein the offer is in response to the request for quote, wherein the offer comprises a first price, and wherein the apparatus is further operable to communicate with the workstation in use by the responding participant via the communications network;

receive from the workstation in use by the requesting participant a lift of the offer received from the responding participant, the requesting participant thereby accepting to buy the item from the responding participant;

post in an electronic marketplace, in response to the requesting participant accepting to buy the item from the responding participant, a bid to buy the item at a second price that is lower than the first price, wherein the bid to buy is posted in the electronic marketplace on behalf of the requesting participant;

determine that the posted bid is accepted in the electronic marketplace by a third-party at the second price;

execute, in response to determining that the posted bid is accepted in the electronic marketplace by the third-party at the second price, at least one transaction to trade the item between the requesting participant and the third-party at the second price;

provide, in response to determining that the posted bid is accepted in the electronic marketplace by the third-party at the second price, a commission to the responding participant;

determine that the posted bid is not accepted in the electronic marketplace; and execute in response to determining that the posted bid is not accepted in the electronic marketplace, at least one transaction to trade the item between the requesting participant and the responding participant at the first price.

12. The apparatus of claim 11, wherein the instructions, that when executed by the at least one processor, further direct the at least one processor to:
receive from the requesting participant a price increment specified by the requesting participant; and determine the second price at which the bid is posted in the electronic marketplace by decreasing the first price by the price increment.

13. The apparatus of claim 11, wherein the instructions, that when executed by the at least one processor, further direct the at least one processor to:
determine a pre-configured price increment; and
determine the second price at which the bid is posted in the electronic marketplace by decreasing the first price by the price increment.

14. The apparatus of claim 11, wherein the posted bid is to be available to be traded in the electronic marketplace for a predetermined period of time; and wherein to determine that the posted bid is not accepted in the electronic marketplace comprises to determine that the posted bid has been available to be traded in the electronic marketplace for the predetermined period of time and not accepted by another party.

15. The method of claim 1, wherein the electronic marketplace is one of a plurality of electronic marketplaces; and wherein the method further comprises:
receiving, by the server, from the requesting participant a selection of the electronic marketplace from among the plurality of electronic marketplaces; and posting, by the server, the offer in the electronic marketplace from among the plurality of electronic marketplaces based at least in part on the selection received from the requesting participant.

16. The method of claim 4, wherein the electronic marketplace is one of a plurality of electronic marketplaces; and wherein the method further comprises:

receiving, by the server, from the requesting participant a selection of the electronic marketplace from among the plurality of electronic marketplaces; and posting, by the server, the bid in the electronic marketplace from among the plurality of electronic marketplaces based at least in part on the selection received from the requesting participant.

17. The apparatus of claim 7, wherein the electronic marketplace is one of a plurality of electronic marketplaces; and wherein the instructions, that when executed by the at least one processor, further direct the at least one processor to:
receive from the requesting participant a selection of the electronic marketplace from among the plurality of electronic marketplaces; and post the offer in the electronic marketplace from among the plurality of electronic marketplaces based at least in part on the selection received from the requesting participant.

18. The apparatus of claim 10, wherein the instructions, that when executed by the at least one processor, further direct the at least one processor to receive from the requesting participant an amount for the predetermined period of time for which the posted offer is to be available to be traded in the electronic marketplace.

19. The apparatus of claim 11, wherein the electronic marketplace is one of a plurality of electronic marketplaces; and wherein the instructions, that when executed by the at least one processor, further direct the at least one processor to:
receive from the requesting participant a selection of the electronic marketplace from among the plurality of electronic marketplaces; and post the bid in the electronic marketplace from among the plurality of electronic marketplaces based at least in part on the selection received from the requesting participant.

20. The apparatus of claim 14, wherein the instructions, that when executed by the at least one processor, further direct the at least one processor to receive from the requesting participant an amount for the predetermined period of time for which the posted bid is to be available to be traded in the electronic marketplace.

21. The method of claim 1,
wherein the electronic marketplace includes a plurality of offers on the item, including the posted offer; wherein the plurality of offers, including the posted offer, are displayed to the requesting participant via the workstation in use by the requesting participant; and wherein the method further comprises the server causing the posted offer to be displayed to the requesting participant differently from the other plurality of offers.

22. The method of claim 4, wherein the electronic marketplace includes a plurality of bids on the item, including the posted bid; wherein the plurality of bids, including the posted bid, are displayed to the requesting participant via the workstation in use by the requesting participant; and wherein the method further comprises the server causing the posted bid to be displayed to the requesting participant differently item the other plurality of bids.

23. The apparatus of claim 7, wherein the electronic marketplace is operable to include a plurality of offers on the item, including the posted offer; wherein the workstation in use by the requesting participant is operable to display to the requesting participant the plurality of offers, including the posted offer; and wherein the instructions, that when executed by the at least one processor, further direct the at least one processor to cause the posted offer to be displayed to the requesting participant differently from the other plurality of offers.

24. The apparatus of claim 11, wherein the electronic marketplace is operable to include a plurality of bids on the item, including the posted bid;

wherein the workstation in use by the requesting participant is operable to display to the requesting participant the plurality of bids, including the posted bid; and wherein the instructions, that when executed by the at least one processor, further direct the at least one processor to cause the posted bid to be displayed to the requesting participant differently from the other plurality of bids.

* * * * *